United States Patent [19]

Ueda et al.

[11] Patent Number: 4,560,261

[45] Date of Patent: Dec. 24, 1985

[54] FLAT CAMERA WITH SELF PHOTOGRAPH FRAMING MIRROR

[75] Inventors: Hiroshi Ueda, Nara; Akira Yoshizaki; Yasuo Masaki, both of Osaka, all of Japan

[73] Assignee: Minolta Camera Kabushiki Kaisha, Osaka, Japan

[21] Appl. No.: 491,846

[22] Filed: May 5, 1983

[30] Foreign Application Priority Data

May 7, 1982 [JP] Japan .................................. 57-77063
Oct. 1, 1982 [JP] Japan .................................. 57-173764

[51] Int. Cl.[4] ........................ G03B 13/02; G03B 13/14
[52] U.S. Cl. ............................... 354/121; 354/195.12; 354/220; 354/221; 354/289.1
[58] Field of Search ............... 354/121, 195.12, 195.13, 354/220, 221, 289.1, 267.1

[56] References Cited

U.S. PATENT DOCUMENTS

| 1,992,068 | 2/1935 | Gwozdecki | 354/220 |
|---|---|---|---|
| 2,531,783 | 11/1950 | Mosca | 354/220 |
| 3,831,184 | 8/1974 | Morse | 354/267.1 |
| 3,836,934 | 9/1974 | Suzuki et al. | 354/195.12 |
| 3,893,137 | 7/1975 | Ettischer | 354/195.12 |
| 4,159,170 | 6/1979 | Kuramoto et al. | |
| 4,239,363 | 12/1980 | Sato | 354/267.1 |

FOREIGN PATENT DOCUMENTS 4710230 8/1967 Japan .
16579 11/1975 Japan .

OTHER PUBLICATIONS

Modern Photography, Apr. 1982, pp. 63 to 65.
Research Disclosure (21538), Mar. 1982, No. 215, pp. 87 to 96.

Primary Examiner—A. A. Mathews
Attorney, Agent, or Firm—Wolder, Gross & Yavner

[57] ABSTRACT

A camera for use with a disk film having a take lens window provided in the front side of a parallelepipedal housing closer to one lateral side thereof and a mirror device disposed at the center of the front side adjacent the window for observing the object. The mirror device is variable in its inclination to correct the parallax due to a variation in the distance of the object and has framing marks for indicating the field of view of the lens which differs with the object distance. The mirror device further has a coverage recognition sign which is observable only from a predetermined position within the coverage where an image of the object can be accurately observed on the device.

16 Claims, 17 Drawing Figures

FLAT CAMERA WITH SELF PHOTOGRAPH FRAMING MIRROR

BACKGROUND OF THE INVENTION

1. Technical Field

The present invention relates to a thin flat camera provided with a framing mirror on the front side of the camera housing.

2. Prior Art

Thin flat cameras are already known, for example, the one disclosed in "Research Disclosure," March 1982, p. 88 and adapted for use with a cartridge of a film disk. The disk is provided approximately at the center of the cartridge with a hub member to be coupled to a rotational drive system within the camera and has a photographic film including 15 image areas arranged around the hub member, with the shorter sides of the areas positioned circumferentially of the disk. The cartridge, which is thin in itself, is suited for providing a compact, flat and lightweight camera. The camera housing is formed with a rectangular exposure opening which has horizontal sides longer than vertical sides and which is located away, radially of the film disk, from the position where the center of the film cartridge is to be located. Accordingly, to make the camera as compact as possible, the camera housing may desirably be designed such that the center of the film cartridge is to be located approximately at the center of the housing while the camera objective or taking lens is positioned approximately in the vertically middle portion of the front wall of the camera housing closer to its one side end. The film cartridge is generally in the form of a square having one corner thereof cut out. The viewfinder optical system may be disposed in the camera housing to look through the cutout, whereby the camera is made further compact.

On the other hand, when a self-portrait picture is taken with a self-timer, it is generally impossible for the user to accurately know his own position within the coverage of the lens or his position relative to other objects within the scene to be photographed. Thus, the user encounters difficulty in photographing the surrounding objects positioned as desired in the picture obtained. To solve such a problem, a viewfinder has also been proposed which has a convex mirror on the front side of a camera for enabling the user to observe the coverage at a location in front of the camera and frame the scene to be photographed.

Namely, it is known to provide a framing mirror, i.e., a mirror for use in the framing, on a camera for showing the photographic coverage of the photographic lens to the user who takes a self-portrait, for example, by self-timer photography. However, where to position the mirror on the front side of the camera demands due consideration. For example, great parallax will result if the mirror is positioned a large distance away from the camera objective lens. Further, if it is positioned close to either side of the front of the camera, a hand of the user holding the camera will touch the mirror and soil the mirror surface as with a fingerprint or the user will have difficulty in holding the camera. Moreover, it is impossible to dispose the mirror at a position where it is likely to interfere with the viewfinder.

The convex mirror of the viewfinder nevertheless is likely to permit deposition of dust or become defaced by contact with some other articles because it is left exposed at all times.

SUMMARY OF THE INVENTION

An object of the present invention is to provide a thin flat camera which has a framing mirror disposed at the most suitable position on the front side of the camera.

Another object of the present invention is to provide a thin flat camera which is free of the foregoing inconvenience to be experienced in self-timer photography and which enables the user to accurately observe himself within the coverage of its lens and to take the desired picture easily by self-timer photography.

Still another object of the present invention is to provide a camera which is corrected for the parallax involved when the framing mirror is viewed from the front of the camera.

Yet another object of the present invention is to provide a thin flat camera which has a viewing mirror for observing the photographic object in self-timer photography and in which the reflecting mirror for observing the object can be protected reliably from dust and other articles except when the camera is set for self-timer photography.

BRIEF DESCRIPTION OF THE DRAWINGS

FIG. 1 is a front view of a camera according to the embodiment;

FIG. 2 is a perspective view showing the camera;

FIG. 3 is a plan view showing the inclination of a framing mirror;

FIG. 4 is a plan view showing the ranges of observation on the framing mirror when the field of view of the taking lens within its angle of view is observed from points F and F' on the optical axis of the lens at a portrait taking distance and a close-up taking distance, respectively;

FIG. 5 is a front view showing the framing mirror;

DESCRIPTION OF THE PREFERRED EMBODIMENTS

Figure 1:
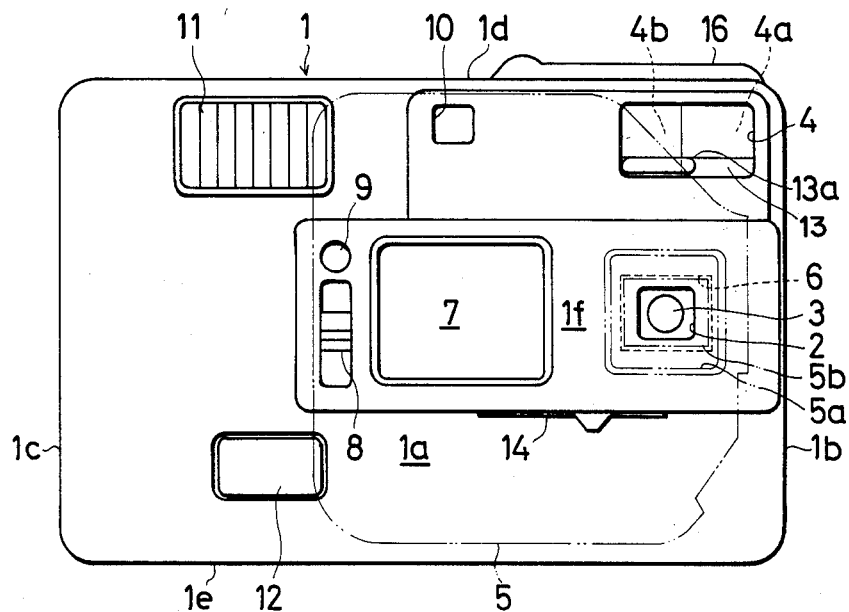
FIGS. 1 to 5 are views showing a first embodiment of the present invention.
Figure 2:
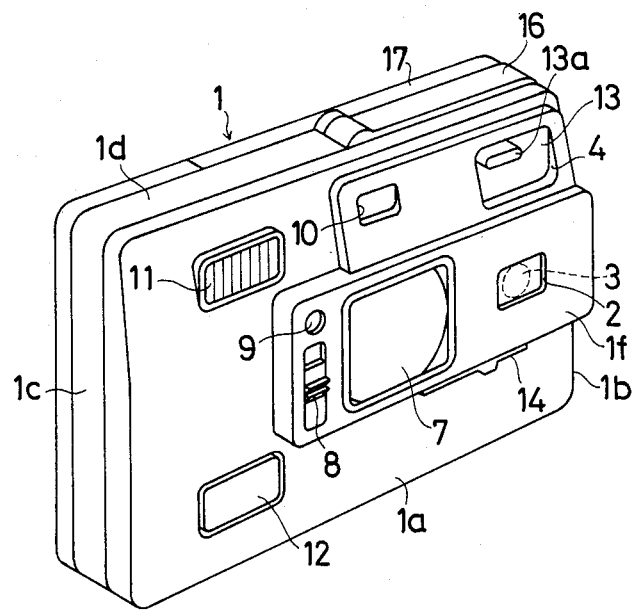

FIGS. 1 to 5 show a first embodiment of the invention. With reference to FIGS. 1 and 2, a generally parallelepiped thin camera housing 1 has a front side 1a, lateral sides 1b, 1c, upper side 1d, lower side 1e and an unillustrated rear side. Approximately on the vertically middle portion of the front side 1a, a wall 1f forwardly projecting from the front side 1a extends transversely from the lateral side 1b through an intermediate portion toward the other lateral side 1c. A lens window 2 is formed in the projecting wall 1f close to the lateral side 1b. A taking lens 3 is disposed behind the window 2.

A viewfinder window 4 is formed in an upper portion of the front side 1a of the camera housing 1 above the lens window 2 and close to the lateral side 1b. An unillustrated viewfinder optical system is arranged behind the viewfinder window 4. The window 4 includes a portion 4a serving as an opening for the viewfinder optical system and another portion 4b serving as a window for admitting light for forming a bright frame in the viewfinder field. As illustrated in FIG. 1, the housing 1 has a film cartridge chamber accomodating therein a disk film cartridge 5 as indicated in two-dot-and-dash line. The wall of the cartridge chamber is formed with an exposure opening 6 which is in alignment with the lens 3. The cartridge 5 is formed in its wall with an exposure opening 5a behind which one of the frames 5b of film to be exposed is positioned. When the cartridge 5 is loaded in the chamber properly, one of the frames 5b is positioned to align with the exposure opening 6.

With the arrangement described above in which the lens window 2 is formed in the projecting wall 1f, the fingers of the user holding the housing by hand will not touch the lens 3, while the wall 1f serves as a hood for the lens 3.

Figure 3:
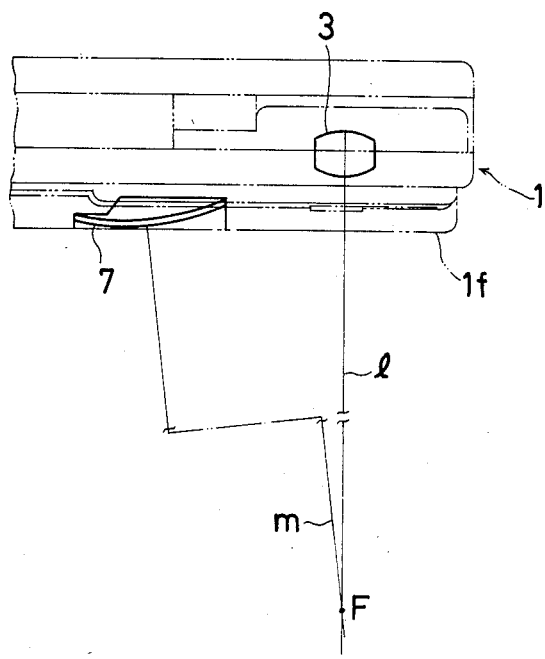

A convex framing mirror 7 disposed in the projecting wall 1f on the side opposite the lens window 2 is positioned approximately in the center of the front side 1a of the housing 1. The framing mirror 7 need not always be a convex mirror provided that it has a negative power. As seen in FIG. 3, the framing mirror 7 is retracted rearward from the front surface of the wall 1f and inclined with respect to a plane (front surface of the wall 1f) perpendicular to the optical axis l of the lens 3. An extension m of a segment of line extending from the center of curvature of the mirror to the center of the mirror surface intersects the optical axis l at a point F which is at a predetermined portrait taking distance. The portrait taking distance is such a distance that the upper halves of the bodies of one to three persons will be within the angle of view of the camera. For example, if the frame 5b, i.e., the image area, of the film measures 10.6 mm horizontally and 8.2 mm vertically and the lens 3 has a focal distance of 12.5 mm, the angle of view of the camera is about 58 degrees, and the portrait taking distance is about 1 m.

A self-timer photography setting member 8 and an indicator 9 comprising a light-emitting diode for indicating the operation of a self-timer are provided on the projecting wall 1f at one side of the framing mirror 7. When the setting member 8 is set in position for self-timer photography, an unillustrated known self-timer circuit operates for self-timer photography, and the indicator 9 goes on and off repeatedly during the operation of the self-timer circuit.

The front side 1a of the housing 1 is provided with a photocell window 10, a flash window 11 and a shutter release button 12. The photocell window 10 is formed above the framing mirror 7. The flash window 11 is disposed in the vicinity of the lateral side 1c and the upper side 1d, so that it is away enough from the taking lens 3 to avoid red-eye phenomenon. Because the flash window is in the upper portion of the front side 1a, it is not likely to be concealed by the fingers of the user holding the camera. The lens window 2 and the finder window 3 are provided with a cover member 13 having a knob 13a. The cover member 13 is movable to open or close the windows 3 and 4 by the knob 13a projecting from the finder window 4. A close-up photography setting member 14 provided on the bottom of the projecting wall 1f is movable horizontally, whereby a close-up taking lens 15 is movable to close-up taking position in register with the lens 3 or to the usual taking position retracted from the lens 3. The shutter release button 12 is disposed in the vicinity of the lateral side 1c and the lower side 1e, so that it is convenient to be pushed by the finger holding the camera.

An unlocking member 16 provided on the top of the housing 1 is used for unlocking a lid 17 for the cartridge chamber. The lid 17 provides the rear side of housing 1.

With the structure described above, the framing mirror 7, which is mounted on the projecting wall 1f away from the first lateral side 1b, will not become an obstacle to the holding of the camera housing 1, nor will the finger of the housing holding hand touch the mirror 7 to soil the surface. Further, because the framing mirror 7 is positioned adjacent the lens window 2 exactly laterally thereof, the mirror 7 needs only to be so inclined as to correct parallax solely in the horizontal direction. Moreover, the amount of the correction can be small.

On the other hand, if the framing mirror is disposed in a lower portion of the housing 1 close to its lateral side 1b or in a position close to the other lateral side 1c, the camera will be difficult to hold, or the finger of the camera holding hand is likely to touch the mirror. When the framing mirror is positioned close to the lateral side 1c of the housing, there is a need to correct the parallax by a greater amount. Further, it is impossible to locate the framing mirror at the position where the finder window is disposed. Besides, although the framing mirror may be disposed above or below the approximate center of the front side of the camera housing, there arises the necessity of correcting the parallax not only in the horizontal direction but also in the vertical direction in such a case.

Accordingly, it is most appropriate to position the framing mirror 7 on the projecting wall 1f adjacent to the lens window 2 exactly laterally thereof as in the present embodiment. The mount portion for the framing mirror 7 projects from the front side 1a to reduce the limitations imposed on the arrangement of the interior mechanism of the housing when the mirror is mounted directly on the front side 1a, and also to reduce the likelihood that the finger manipulating the shutter release button or like operating member on the front side 1a will inadvertently touch the mirror. According to the present invention, however, the mirror mount portion need not always project from the front side 1a.

Figure 4:
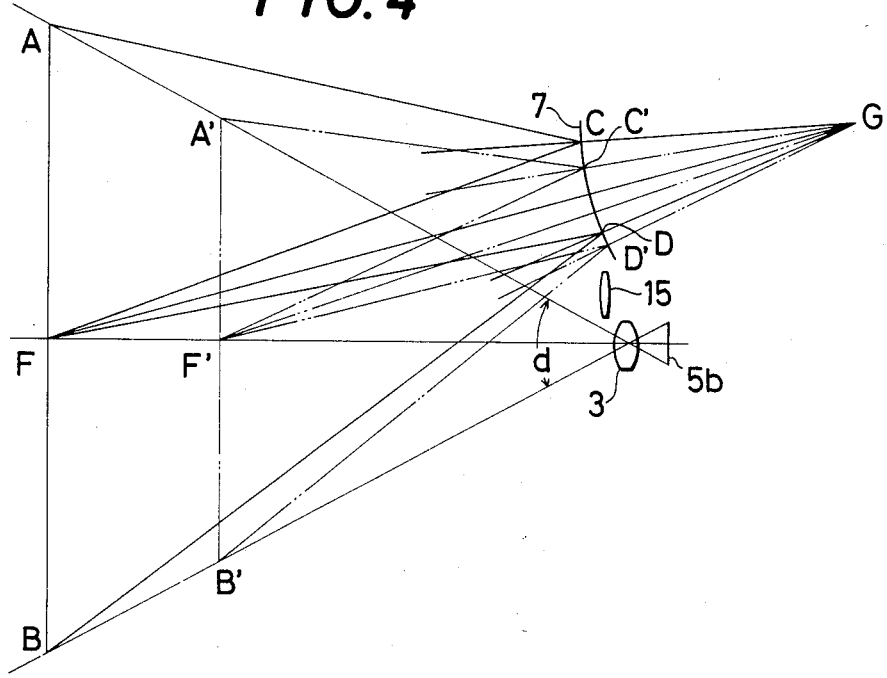
Figure 5:
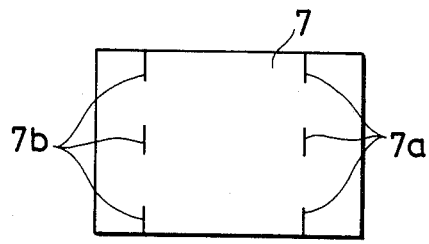

FIG. 4 shows the ranges of observation on the framing mirror 7 when the field of view of the lens 3 within its angle of view α is observed from points F and F' on the optical axis l of the lens 3 at the portrait taking distance and close-up taking distance, respectively. The close-up taking distance is the distance of the object to be photographed when the close-up taking lens 15 is in register with the lens 3 and is given by the combined focal distance of the lenses 15 and 3. When the framing mirror 7 is viewed from the point F in FIG. 4, the field of view AB within the angle of view α can be observed over a range CD, while when the mirror 7 is viewed from the point F', the field of view A'B' within the angle of view α is observable over a range C'D'. Accordingly, if the mirror 7 is marked with lines 7a, 7b at the positions D, C′ in FIG. 4 as seen in FIG. 5, the lines 7a serve as a framing mark for taking self-portraits, and the lines 7b as a framing mark for taking close-ups to show the limit of the coverage of the camera for each mode of photography.

Instead of fixing the framing mirror 7 in position, the mirror 7 may be made movable about the center G of its curvature when the camera is set for close-up photography.

Figure 6:
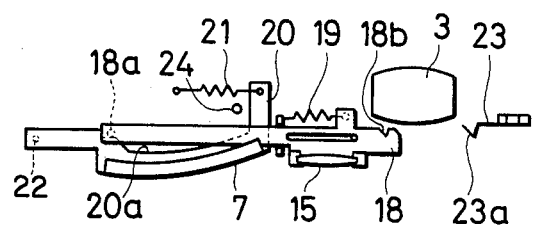
FIG. 6 is a fragmentary plan view showing a second embodiment of the invention.

FIG. 6 shows an embodiment wherein the framing mirror 7 is made movable about a pivot in the vicinity of the center of the mirror surface with the movement of the close-up photography setting member 14. A lens holder 18 retaining the close-up taking lens 15 is integral with the setting member 14 and is biased leftward by a spring 19. A mirror holder 20 holding the framing mirror 7 has a cam face 20a adapted for contact with a pin 18a on the lens holder 18 and is biased counterclockwise about a pivot 22 by a spring 21. When the lens holder 18 is moved rightward against the spring 19 by the close-up photography setting member 14, a pawl 23a of a plate spring 23 engages in a cutout 18b in the lens holder 18 to hold the lens 15 in the close-up taking position in register with the lens 3. At this time, the pin 18a moves away from the cam face 20a, so that the mirror holder 20 is rotated counterclockwise by the force of the spring 21 and stopped by contact with a stopper 24, consequently causing the mirror 7 to face toward the point F′ in FIG. 4.

When the setting member 14 is pushed leftward, the pawl 23a is released from the cutout 18b, and the lens holder 18 moves leftward under the action of the spring 19, causing the pint 18a to push the cam face 20a. As a result, the mirror holder 20 rotates to the illustrated position against the spring 21 to direct the mirror 7 toward the point F in FIG. 4, with the lens 15 held retracted from the lens 3.

Instead of rotating the framing mirror 7, the mirror can be made movable in parallel with a plane perpendicular to the optical axis 1 of the lens 3. In this case, the mirror 7 is moved toward the lens 3 in parallel with the plane with the movement of the setting member 14 to the close-up taking position. When assuming that the segment of line extending from the point F to the center G of curvature in FIG. 4 also translates with this movement, the mirror 7 is so adapted as to stop at the position where the segment of line passes the point F′. The parallax to be involved in the close-up taking position relative to the portrait taking position can be corrected also by this arrangement.

Figure 7:
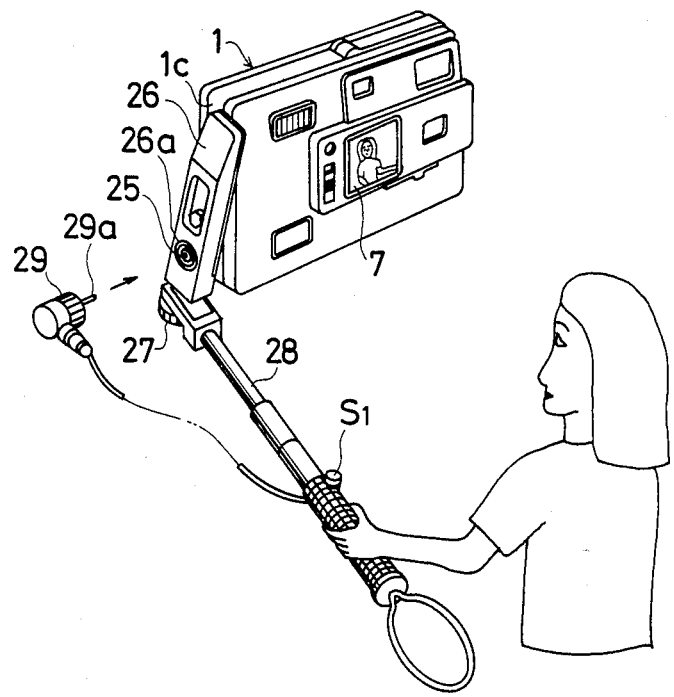
FIG. 7 is a perspective view showing a third embodiment of the invention as it is being used with a supporter rod.

FIG. 7 shows an embodiment which is so adapted that photographs can be taken while observing the framing mirror 7 also when not using the self-timer. An attachment member 26 is rotatably supported on a pivot 25 mounted on the second lateral side 1c of the camera housing 1. A telescopic supporter rod 28 can be attached to the attachment member 26 by a tripod screw 27 to be screwed in a tripod screw bore formed in the bottom of the member 26. A cable release 29 has a connecting pin 29a which is insertable into and connectable to a release terminal 26a on the attachment member 26. The cable release 29 is mounted on the supporter rod 28 and has a release button switch S1, which, when depressed, feeds a release signal to the unillustrated release circuit within the housing 1 via the connecting pin 29a and the terminal 26a to release the shutter.

Thus a photograph can be taken by a person who stands in front of the camera with the support rod 28 in his hand, when he depresses the release switch S1 while observing on the framing mirror 7 the coverage of the camera including himself. Since the rod is telescopic, photographs can be taken either at the portrait taking distance or at the close-up taking distance. The attachment member 26 may be semi-fixed in the desired angular position relative to the housing with use of a friction spring, or as held in one of angular positions by a click stop, as already known.

When the camera is settable for close-ups, with the framing mirror fixed to the camera housing, the mirror is provided with framing marks for indicating the limits of the coverage of the camera when the mirror is viewed from a point on the optical axis of the taking lens at the close-up taking distance and from a point thereon at a specified distance suited for taking usual portraits, as already stated. The coverage can then be accurately recognized from these points for taking close-ups and for photographing objects in usual manner at portrait taking distance.

When the camera of the present invention is used, the coverage of field of view of the camera is recognized by observing the framing mirror not for self-timer photography only, as will be apparent from the embodiment of FIG. 7. The present camera is further useful, for example, when it is to be operated by a child who is unskilled in photography. In this case, the person to be photographed can recognize the coverage and give instructions to the child, the photographer, so that the child can properly direct the camera. Thus the framing mirror is useful for the usual mode of photography in which the rod 28 shown in FIG. 7 is not used.

Figure 8:
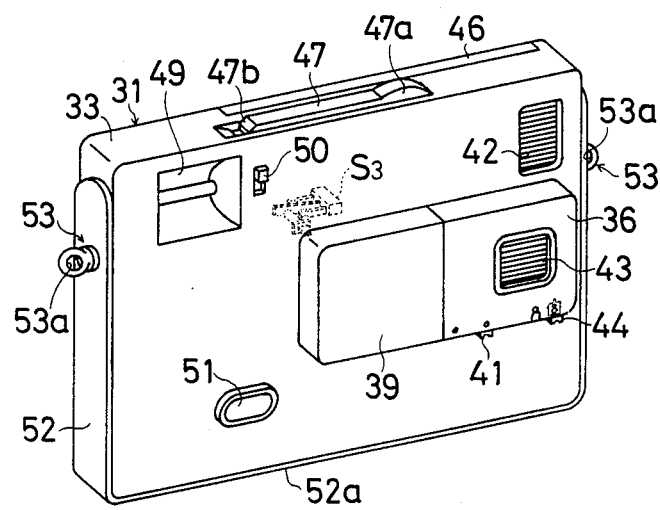
FIGS. 8 and 9 are perspective views showing the appearance of a fourth embodiment of the invention.
Figure 9:
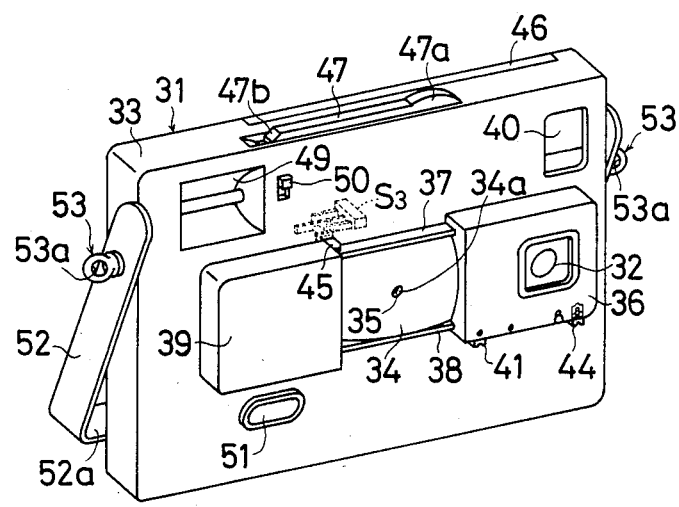

FIGS. 8 to 11 show another embodiment having a recognition sign recognizable by a person who is an object to be photographed for use in self-timer photography. With reference to FIG. 8, a camera 31 adapted for use with a disk film cartridge has a convex mirror 34 approximately in the center of the front side of the camera housing 33 as in the foregoing embodiments. As shown in FIG. 9, the recognizing device comprises a coverage recognition sign 35 placed in an aperture 34a formed in a specified position in the reflecting surface of the mirror 34 so that a person in a predetermined position within the coverage of the taking lens 32 of the camera can observe the sign 35.

The coverage recognition sign 35, which comprises a light emitting diode, is mounted in the center of the convex mirror 34 so as to be observable insofar as the mirror 34 is viewed by the observer whose face is positioned in the center of the coverage of the lens 32.

The lens 32 is installed in a square block 36 projecting from a right-hand portion of the front side of the camera housing 33. A mirror protecting cover 39 having the same square form as the block 36 is provided on the front side of the mirror 34 so as to be horizontally slidable on retaining frames 37 and 38 extending alongside the upper and lower edges of the mirror 34. When the protecting cover 39 is in the position where the mirror 34 is thereby completely covered, the cover 39 and the block 36 form a combined block.

A finder 40 is provided in a right upper portion of the housing front side near the block 36. As shown in FIG. 8, the finder 40 and the lens 32 are covered with curtain members 42, 43 which are retractable by a knob 41 provided on the lower edge of the block 36 when the knob is slidingly moved leftward. Another knob 44 for zone focusing is provided on the lower edge of the block 36.

Figure 10:
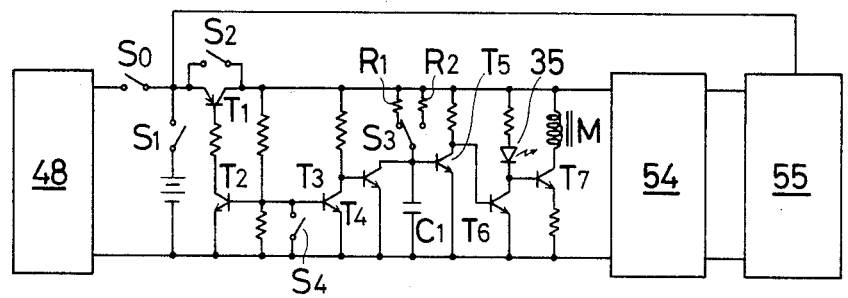
FIG. 10 is a control circuit diagram of the same.
Figure 11:
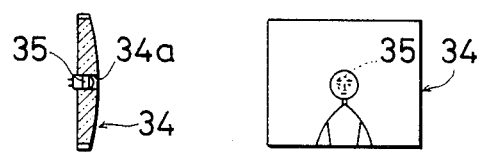
FIGS. 11(a) and (b) are a view in vertical section and a front view of a convex mirror.

At an intermediate portion of the path of sliding movement of the protecting cover 39, there is provided a switch actuator 45, which is depressed by the cover 39 when it is in the covering position. A change-over switch S3 in a control circuit housed in the housing 33 and shown in FIG. 10 is closed for self-timer setting (at resistor $R_2$ in FIG. 10) when the actuator 45 is released by the retraction of the cover 39.

The camera housing 33 has a rear lid 46 which is opened and closed when the film cartridge is loaded into or unloaded from the camera. The rear lid 46 is locked or unlocked by an opening lever 47 mounted on the top of the housing 33. The lid opening lever 47 is pivoted at its base end 47a to the housing 33 and has a forward end 47b which, when turned clockwise, drives an unillustrated connecting member provided in the cartridge chamber within the housing 33. An illustrated shield plate for closing the exposure window of the cartridge is then pushed to its shielding position by the connecting member, and the rear lid 47 is thereafter unlocked.

The camera housing 33 is provided, at the left shoulder portion of its front side, with the light emitting portion 49 of a flash unit (with a circuit 48 shown in FIG. 10) incorporated therein and a button 50 for changing the mode of photography. A release button 51 is disposed at a left lower portion of the front side. The mode change button 50 is used for operating the power supply switch (indicated at S0 in FIG. 10) of the flash unit and for setting an exposure control unit for flash photography.

A generally U-shaped support member 52 extending along the lateral sides and the bottom side of the housing 33 is attached to the housing by pivots 53 and 53 each having a suspender connecting ring 53a. The support member 52 is regulated to turn to a predetermined angle so that the housing 33 can be retained in the desired inclined position to direct the lens 32 toward the object, with the horizontal portion 52a of the support member and the bottom of the housing 33 placed on the ground as seen in FIG. 9.

The turn of the support member 52 is regulated by the friction between an unillustrated friction member provided at the lower end portion of each pivot 53 and an unillustrated spring ring provided between the support member 52 on the pivot 53 and each lateral side of the housing 33.

The operation of the above embodiment will be described below.

When the knob 41 is moved leftward from the position of FIG. 8 in which the camera is in its inoperative state, the curtain members 42, 43 covering the finder 40 and the lens 32 are retracted, and the power supply switch S1 of the control circuit shown in FIG. 10 is closed with this movement.

When the protecting cover 39 covering the convex mirror 34 as shown in FIG. 8 is then retracted leftward to expose the mirror 34 toward the object as seen in FIG. 9, the actuator 45 is released by the retraction, whereby the switch S3 of the control circuit closed at a resistor R1 is alternatively closed at the resistor R2. The release button 51 is depressed in this state to turn on a release switch S2 of the circuit and bring a transistor T2 into conduction. A power supply maintaining transistor T1 therefore conducts to continue the supply of power even if the release switch S2 is thereafter turned off.

Upon the closing of the release switch S2, on the other hand, a transistor T3 conducts, while a transistor T4 is turned off to charge a self-timer delay circuit comprising the resistor R2 and a capacitor C1. In the meantime, a transistor T5 is off, and a transistor T6 is on, with the result that the coverage recognition sign 35, namely, light emitting diode, connected in series with the transistor T6 lights up.

When the voltage of the charge in the capacitor C1 of the delay circuit reaches a predetermined level, the transistor T5 conducts and the transistor T6 is brought out of conduction to turn off the sign 35.

Upon the turning off of the transistor T6, a transistor T7 conducts to energize a release electromagnet M. Consequently the magnetic force of a permanent magnet holding the release member is counteracted by the magnetic force of the magnet M which acts in an opposite direction to the former force, so that the release member is freed to open the shutter. With the opening of the shutter, an exposure control circuit 54 functions to close the shutter upon the lapse of a predetermined period of time to complete the film exposure operation.

A winding circuit 55 functions in response to a signal indicating the complete closing of the shutter to transport the film and cock the shutter.

A switch S4 of the control circuit closes in response to the above signal, whereupon the transistors T2 and T3 are turned off, and the transistor T1 is turned off to discontinue the supply of power. At the same time, the transistor T4 conducts to permit the capacitor C1 of the self-timer delay circuit to discharge the charge via the transistor T4.

After making the camera ready for self-timer photography by retracting the protecting cover 39, the person to be photographed, while observing the convex mirror 34 from the object side, locates a position where his own image can be viewed on the mirror 34 and thereby recognizes that he is now within the coverage of the camera. He further adjusts his position so that the recognition sign 35 in the central aperture 34a of the mirror 34 can be observed, whereby he recognizes that he is in the specified position within the coverage of the camera. He can then also accurately observe his own position relative to other objects within the coverage of the camera.

With the present embodiment, the face of the observer (photographer) appears overlapping the coverage recognition sign 35 in the center of the convex mirror 34 as seen in FIG. 11(b), from the position where the sign 35 can be recognized. Stated more specifically with reference to FIG. 12, when the convex mirror 34 is viewed by the observer, i.e., the object, who is positioned at a point A at a distance L away from the camera body 33 and within the range l of angle $\theta$ in which the light of the sign 35 is observable, the object over the range of angle $\theta A$ can be recognized on the mirror. Since the range of the object image is set to approximately correspond to the coverage of the taking lens 32, the convex mirror 34 accurately indicates the coverage, i.e. the field of view to be photographed.

Figure 12:
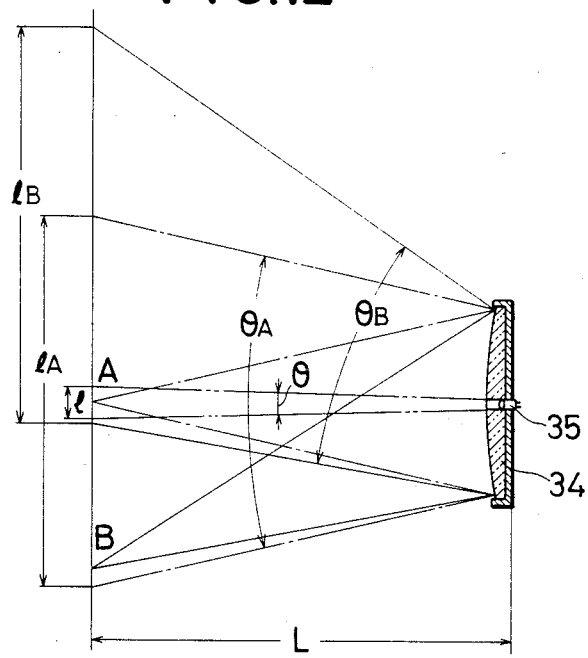
FIG. 12 is a diagram showing how the coverage of the camera is recognized by the use of the convex mirror.

Incidentally, if the mirror 34 is viewed by an observer (person to be photographed) at a point B where the the light of the sign 35 is out of sight in FIG. 12, he observes, instead of his own image, a coverage lB which is displaced from the proper coverage lA in a direction opposite to the direction of displacement of his position. Thus, unless the position is recognized by means of the sign 35, he is unable to judge whether the coverage viewed in the mirror 34 is proper or not.

The coverage recognition sign 35 comprising the light emitting diode can be easily observed for the recognition of the coverage since it is lighted up after setting the camera for self-timer photography as already stated.

Because the convex mirror 34 is surrounded by the retaining frames 37, 38 at its upper and lower edges and by the protecting cover 39 in its retracted position and the side face of the block 36 at its opposite side edges, the frames 37,38, the cover 39 and the block 36 function in combination as a hood for the mirror.

The position in which the camera housing 33 is supported is not limited to the inclined position shown in FIG. 9 in which the support member 52 is turned to a regulated position on the rear side of the housing 33 to direct the optical axis of the lens 32 forwardly upward. Conversely, the housing can be forwardly inclined with the optical axis of the lens 32 directed forwardly downward by positioning the support member 52 at a turned regulated location on the front side of the housing 33. Alternatively the housing can of course be suspended, for example, from a branch of a tree with use of the support member 52.

To discontinue the photographic procedure after self-timer photography setting, the knob 41 is moved rightward from the position shown in FIG. 9 to cover the finder 40 and the lens 32 with the curtain members 42, 43. On the other hand, the power supply switch S1 is turned off to bring the transistors T2 and T1 of the control circuit of FIG. 10 out of conductive state and immediately discontinue the supply of power to the self-timer delay circuit, i.e., the charging circuit comprising the resistor R2 and the capacitor C1. The transistor T4 is then turned on to instantaneously discharge the charge from the capacitor C1 to discontinue the operation of the self-timer.

Figure 13:
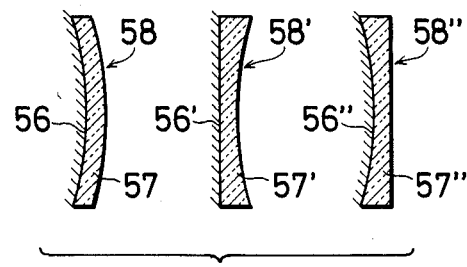
FIGS. 13(a), (b) and (c) are views in vertical section showing different modified reflectors.

Although the convex mirror 34 is used as the framing mirror for enabling observation of the coverage of the lens 32, any reflector is usable insofar as it has a negative power, i.e., the properties to reflect the light from an object in a diverging fashion. Useful examples are a reflector 58 comprising a convex mirror surface 56 and a transparent plate 57 having a uniform thickness, made of acrylic resin, glass or the like and affixed to the surface as shown in FIG. 13(a), a reflector 58' comprising a planar mirror surface 56' and a concave lens 57' having a concave front surface and affixed to the surface 56' as shown in FIG. 13(b), and a reflector 58" comprising a concave lens 57" having a concave rear surface and affixed to a convex mirror surface 56" as shown in FIG. 13(c).

With the reflector 58, 58' or 58", the transparent plate 57 or the concave lens 57' or 57" covering the mirror surface 56, 56' or 56" serves to protect the mirror surface.

With the foregoing embodiment of FIGS. 8–12 embodiment, the image of the object on the convex mirror 34 as viewed by an observer (the person to be photographed) at a proper distance from the camera has the face of the observer positioned approximately at the center and is not suited to the usual mode of photographic layout in which the face of the object is positioned in the upper half of the coverage of the camera. However, when an upwardly deviated portion only of the convex mirror 34 is used as a convex mirror 34' as shown in FIG. 14, with a recognition sign 35' embedded in the upper half of the mirror 34', so that an observer viewing the mirror 34' from a position slightly upward from the center of the proper coverage can observe an image of the proper coverage on the mirror 34' (with the face of the observer positioned slightly above the center in the image) and also the sign 35', the embodiment can be adapted for the usual mode of layout in which the face of a person is positioned above the center of the coverage.

Figure 14:
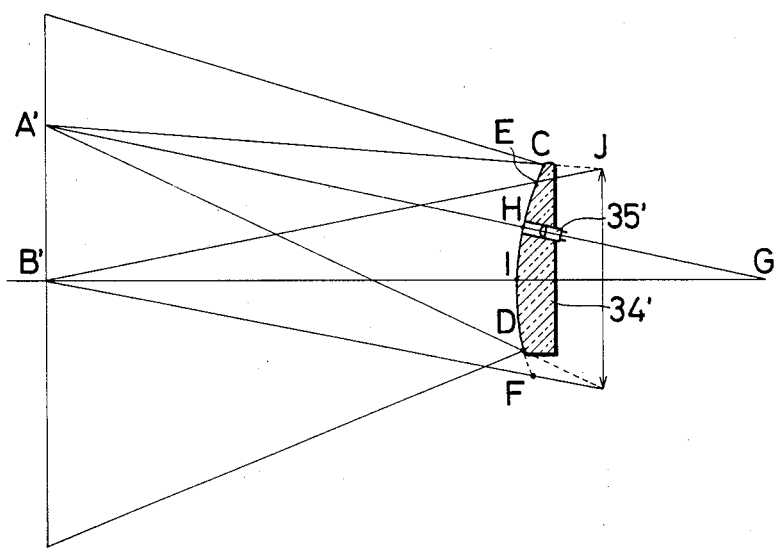
FIG. 14 is a diagram illustrating how the coverage of the camera is recognized according to another embodiment of the invention.

Stated more specifically with reference to FIG. 14, the necessary area of the convex mirror 34' shown in a vertical curve is shifted to CD from EF (necessary area when the image J of an object is viewed from the center B' of the object), the CD being upwardly deviated from the EF, so that the image J can be observed when viewed from A' above the center B' (that is above the center of the proper coverage). The coverage recognition sign 35' is disposed at the position of the intersection H of the vertical mirror curve with a segment of line A'G extending from the center G of the curvature of the mirror 34' to the position of observation, so that the face of the observer in the image of the object on the mirror 34' will overlap the sign 35'. While the convex mirror 34' is shifted upward from the corresponding position in the foregoing embodiment, the mirror 34' can be located in the same position as in the foregoing embodiment if slightly inclined rearward to direct its optical axis forwardly upward.

According to the above embodiment of FIGS. 8–12, the protecting cover 39 serves also as a member for setting the camera for self-timer photography, while a self-timer photography setting member may be provided independently of the protecting cover 39 to open or close the cover 39 with the setting or unsetting movement of the independent setting member.

The camera according to the embodiment of FIGS. 8–12 is provided with a framing mirror having a negative power and disposed in the vicinity of the lens window of the camera housing so that an observer in a specified position within the coverage of the lens can observe an image of the object corresponding to the coverage, and a protecting cover for exposing or covering the framing mirror. When the camera is set for self-timer photography, the framing mirror is exposed to enable the observation of the arrangement of the object within the coverage as viewed from the object side, while when the camera is brought out of the condition for self-timer photography, the framing mirror can be covered and reliably protected by the cover.

Furthermore, a coverage recognition sign is provided in a specified portion of the framing mirror so as to be observable only from a predetermined position where an object within the coverage of the camera can be observed on the framing mirror. Accordingly the position or arrangement of the object within the coverage can be accurately observed from the object side for the user to photograph the object in the desired arrangement with ease by use of self-timer.

What is claimed is:

1. A flat camera comprising:
   a generally parallelepiped flat housing which is thin in the forward and rearward direction and which has a cartridge chamber adapted to receive a disk film cartridge, a front, a rear, a top, a bottom and first and second laterally spaced sides;
   a lens window approximately vertically medially located on said housing front side proximate said first side;

a primary taking lens disposed behind said lens window;

a movable framing mirror approximately centrally located on housing front, laterally proximate to said lens window and having a reflector surface for enabling observation of an object from the front of said camera;

a close-up taking lens supported for movement between a close-up photography position where it is in optical registry with said primary taking lens and a normal photography position where it is retraced from optical registry with said primary taking lens; and means for moving said framing mirror to alter the inclination thereof with respect to the optical axis of said primary taking lens in accordance with the movement of said close-up taking lens between said close-up photograph position and said normal photography position to minimize parallax on said framing mirror reflector surface between the condition where said framing mirror is viewed from a close-up photography distance position in front of said camera with said close-up lens in said close-up photography position and the condition where said framing mirror is viewed from a normal photography distance position in front of said camera with said close-up lens in said normal photography position.

2. A flat camera as defined in claim 1, wherein said framing mirror is pivotable about a vertical axis to alter the inclination thereof with respect to the optical axis of said primary taking lens.

3. A flat camera as defined in claim 1, wherein said framing mirror has a negative power.

4. A flat camera comprising:

a generally parallelepiped flat housing which is thin in the forward and rearward direction and which has a cartridge chamber adapted to receive a disk film cartridge, a front, a rear, a top, a bottom and first and second laterally spaced sides, said front being provided with an approximately vertically medially located projecting wall which has a front surface and which extends in the lateral direction from said housing first side towards said housing second side through the central portion of said front side;

a lens window formed on said projecting wall at a position proximate to said housing first side and approximately vertically medially disposed relative to said housing front;

a primary taking lens provided behind said lens window; and a framing mirror having a mirror surface enabling the observation of an object from the front of said camera and provided on said projecting wall at a position approximately central on said housing front and laterally proximate to said lens window with said mirror surface retracted rearwardly of the front surface of said projecting wall.

5. A flat camera as defined in claim 4, further comprising a close-up taking lens supported behind said projecting wall for movement between a close-up photography position in optical registry with said primary taking lens and a normal photography position retracted from optical registry with said primary taking lens.

6. A flat camera as defined in claim 5, further comprising a viewfinder window provided in said housing front at a position proximate to both said housing first side and said housing top above said projecting wall.

7. A flat camera as defined in claim 6, further comprising an electronic flash device having a light emitting portion provided on an upper portion of said housing front proximate to said housing second side.

8. A thin flat camera as defined in claim 7, further comprising a shutter release button provided at a lower portion of said housing front proximate to said housing second side.

9. A flat camera as defined in claim 5, further comprising an operating member provided on the lower side of said projecting wall to be manually operable for moving said close-up taking lens between said close-up photography position and said normal photography position.

10. A flat camera as defined in claim 4, further comprising a self-timer, a self-timer photography setting member provided on said projecting wall at a position laterally proximate to said framing mirror and manually operable for setting said self-timer and a light emitting self-timer indicator provided on said projecting wall at a position laterally adjacent to said framing mirror and vertically adjacent to said self-timer photography setting member.

11. A flat camera comprising:

a generally parallelepiped flat housing which is thin in the forward and rearward direction and which has a cartridge chamber adapted to receive a disk film cartridge, a front, a rear, a top, a bottom and first and second laterally spaced sides;

a lens window approximately vertically medially located on said housing front proximate said side housing first a primary taking lens disposed behind said lens window;

a movable framing mirror approximately centrally located on said housing front laterally proximate to said lens window and having a reflector surface for observation of an object from the front of said camera; and a protecting cover supported on said housing for movement between a closed position where it covers said framing mirror and a retracted position where it exposes said framing mirror.

12. A flat camera as defined in claim 11, further comprising a self-timer settable for operation by the movement of said protecting cover from said closed position to said retracted position.

13. A flat camera as defined in claim 12, further comprising a recognition sign, wherein said framing mirror is formed with an aperture extending such that said recognition sign can be observed only from a given position within the field of view of said primary taking lens and said framing mirror is adapted to enable observation of the field of view of said primary taking lens from said given position.

14. A flat camera as defined in claim 13, wherein said recognition sign includes a light emitting member adapted to light up during the operation of said self-timer.

15. A flat camera as defined in claim 13, wherein said aperture is provided at the upper half of said framing mirror and inclined in such a manner that said recognition sign can be observed from the given position which is located at the upper half of the field of view of said primary taking lens.

16. A thin flat camera having a generally parallelepiped thin housing and a chamber formed in the housing for accommodating a disk film cartridge, comprising:
  a lens window approximately vertically medially disposed in the front side of said housing and positioned close to one lateral side of the housing;
  a taking lens provided behind the lens window;
  a framing mirror provided on the front side of the housing adjacent to and laterally of the lens window and inclined in a direction intersecting the optical axis of the lens to correct parallax and positioned approximately at the center of the front side for enabling observation of the object from the front of the camera; and
  means for moving the framing mirror to alter the inclination of the framing mirror in accordance with a variation in the distance of the object to be photographed by the lens to thereby correct the parallax due to the variation.

* * * * *